United States Patent [19]
Nagane et al.

[11] Patent Number: 5,430,484
[45] Date of Patent: Jul. 4, 1995

[54] ORIGINAL ILLUMIATING DEVICE AND ORIGINAL READING DEVICE PREVENTING RANDOM REFLECTED LIGHT

[75] Inventors: Hiromichi Nagane; Ko J. Takahashi, both of Yokohama, Japan

[73] Assignee: Canon Kabushiki Kaisha, Tokyo, Japan

[21] Appl. No.: 51,301

[22] Filed: Apr. 23, 1993

Related U.S. Application Data

[62] Division of Ser. No. 759,901, Mar. 6, 1991, Pat. No. 5,313,289.

[51] Int. Cl.[6] .............................................. G03B 13/02
[52] U.S. Cl. .................................... 348/370; 348/335
[58] Field of Search ................................. 359/385–390; 358/213.11, 213.13, 213.19, 225; 348/335, 370

[56] References Cited

U.S. PATENT DOCUMENTS

| | | | |
|---|---|---|---|
| 4,039,825 | 8/1977 | Doyle | 250/203 R |
| 4,186,993 | 2/1980 | Shimizu et al. | 350/91 |
| 4,560,240 | 12/1985 | Sekimura | 350/336 |
| 4,637,720 | 1/1987 | Shirayanagi et al. | 356/125 |
| 4,895,432 | 1/1990 | Iwashita et al. | 350/339 R |
| 5,157,422 | 10/1992 | Miyabayashi | 346/153.1 |
| 5,182,443 | 1/1993 | Suda et al. | 250/201.2 |
| 5,245,469 | 9/1993 | Goto | 359/362 |

*Primary Examiner*—Stephen Brinich
*Attorney, Agent, or Firm*—Fitzpatrick, Cella, Harper, Scinto

[57] ABSTRACT

An original illuminating device includes a light source, and a condensor lens for condensing light emitted from the light source to illuminate an original with light issued from a condensing surface of the condensor lens. Surfaces of the condensor lens, which are different from condensing surfaces, are light diffusion surfaces.

18 Claims, 10 Drawing Sheets

ORIGINAL ILLUMIATING DEVICE AND ORIGINAL READING DEVICE PREVENTING RANDOM REFLECTED LIGHT

This application is a division of application Ser. No. 07/759,901 filed Mar. 6, 1991, now U.S. Pat. No. 5,313,289, issued May 17, 1994.

BACKGROUND OF THE INVENTION

1. Field of the Invention

This invention relates to an original illuminating device which illuminates an original with light-emitting devices, and which is used in a facsimile, a copier or the like. The invention also relates to an original reading device which reads light from an illuminating device with a reading member.

2. Description of the Related Art

Heretofore, light sources emitting a large amount of light, such as fluorescent tubes, xenon tubes and the like, have been used as light sources for image reading apparatuses, such as facsimile machines and the like. Recently, however, since photosensors, such as CCDs (charge-coupled devices) and the like, tend to have higher sensitivity, light sources comprising light-emitting devices emitting a small amount of light, specifically, LEDs (light-emitting diodes) arranged in the shape of an array have appeared in the market.

This is because the LED has, for example, the following features. The LED can be provided in a small size and with low cost since it does not need an inverter for lighting it as do fluorescent tubes and xenon tubes. The LED does not generate high-frequency noise since it does not need high-frequency lighting. Furthermore, the LED has more stable rising characteristics and temperature characteristics than fluorescent tubes and xenon tubes.

An explanation will now be provided of a device using LEDs.

FIG. 7 shows the schematic configuration of an original reading device 100, to describe a background technique of the present invention.

In FIG. 7, there are shown an upper original mount 101, a white reference background 102 provided at the lower surface of the upper original mount 101, lower original mounts 103 and 104, and an original-mount glass 105. Below the original-mount glass 108 are disposed a substrate 106, a reflecting plate 112, and a photosensitive member, such as a photoelectric conversion device or the like (not shown). The substrate 106 faces reading position A of an original in a state inclined about 45° relative to the original-mount glass 105.

FIG. 8 is a perspective view of the substrate 106.

On an identical surface of the substrate 106 there are linearly arranged LED chips 107, serving as a plurality of light-emitting devices, disposed in the direction of the longitudinal direction, and there are also arranged, in parallel, electrodes (made of a metal, such as gold, silver, A1 or the like) 108 for passing current corresponding to the respective LED chips 107. The electrodes 108 are situated at positions so as to pass between the LED chips 107 and enclose the LED chips from both sides in the direction of the width of the substrate 106 orthogonal to the longitudinal direction thereof. Each of the electrodes 108 is connected to the corresponding LED chip 107 using a bonding wire 108a. There are also shown resistors 109, and patterns 110 and 111 for passing current to the substrate 106.

The LED chips are electrically connected so that a plurality of (eight in the case of FIG. 8) LED chips are connected in series using the electrodes and the bonding wires to form a group, and respective groups are connected in parallel using a circuit pattern. Since LED chips within one group are connected in series, respective electrodes are arranged while being separated with a space l.

In the original reading device 100 configured as described above, current is supplied to the substrate 106 from the outside to cause the LED chips 107 to illuminate the reading position A of the original D through optical path E shown by one-dot chain lines, as shown in FIG. 7. The light reflected by the original D is guided to the photosensitive member through optical path B, and an image on the original D is read.

The above-described device, however, has the following disadvantages, since the LED chips 107 and the electrodes 108 are provided on the same surface of the substrate 106.

It can be considered that each LED chip 107 is a point light source around the reading position A. Illuminating light from each LED chip 107 is randomly reflected by surrounding components in a complex manner to illuminate the entire area. Such randomly-reflected light reaches the electrodes 108 and illuminates the reading position A as a secondary light source, thereby adversely influencing a reading operation by the photosensitive members.

That is, the reflected light which has reached the electrodes 108 situated at the side of the optical path B relative to the LED chips 107 reaches the reading position A via optical paths E, M and N, as shown in FIG. 7. In this case, the light beams along the optical paths N and M illuminate the reading position A from a direction closer to the perpendicular direction relative to the original-mount glass 105 than the light beam along the optical path E. Hence, according to a certain setting of the optical paths, such light, serving as a secondary light source, is specularly reflected by the lower and upper surfaces of the original-mount glass 105, and is incident upon the CCD via a mirror optical system and a lens, acting in some cases as white noise which is different from the light reflected from the surface of the original D. Such a white-noise component is in some cases as large as about 10% -20%. As a result, the randomly-reflected light causes a failure in a reading operation of an image on the original; for example, the original D is determined to be white while it is actually black.

As described above, the electrodes 108 on the substrate 106 are not continuous along the longitudinal direction, but are arranged in a mosaic pattern having a gap l. Hence, the above-described white noise caused by the secondary light source has variations in its magnitude in the longitudinal direction of the substrate. As a result, an undulation as indicated by a broken line in FIG. 5 appears in the output from the photosensitive member even if the original D is totally white.

Next, an explanation will be provided of a case wherein a condenser lens is provided incident on the LED chips in order to increase the amount of light on the reading position A. FIG. 16 illustrates the schematic configuration of an original reading device, to describe a background technique of the present invention.

In FIG. 16, there are shown an upper original mount 201, a white reference background 202 provided at the lower surface of the upper original mount 201, lower original mounts 203 and 204, and original-mount glass 205. Below the original-mount glass 205 are disposed a substrate 206, and a photosensitive member, such as a photoelectric conversion device or the like (not shown). The substrate 206 faces illuminating position A of an original in a state inclined about 20°–40° relative to the original-mount glass 205.

On the upper surface of the substrate 206 are linearly arranged LED chips 208, serving as a plurality of light-emitting devices, disposed in the longitudinal direction thereof (the direction of the width of the original). A condenser lens 209 having condensing surfaces 209a and 209b is disposed above the LED chips 208. The condenser lens 209 may be provided in various manners. For example, each condenser lens 209 may be disposed for each LED chip 208. Alternatively, a rod-like condenser lens 209 may cover the entire row of the LED chips 208. Optical path 301 may be inclined in a direction separate from the LED chips 208 relative to the original-mount glass 205 in order to obtain a necessary amount of light by disposing the substrate 206 closer to the reading position A. The substrate 206 is secured to a holding member 211 using a lock screw 210.

In an original reading device 200 configured as described above, the LED chips 208 emit light to illuminate the reading position A of the original through optical path 300 shown by the one-dot chain line. The light reflected by the original,is guided to the photosensitive member through the optical path 301, and an image on the original is read.

The above-described device, however, has the following disadvantages, since the condenser lens 209 is disposed above the LED chips 108.

In the above-described original reading device 200, each LED chip 208 can be considered as a point light source. The light emitted from the LED chips 208 illuminates the original reading position A via the condensing surfaces 209a and 209b of the condenser lens 209. Part of the light, however, is randomly reflected by condensing portions and sides of the condenser lens 209 not directly related to the condensing function, and mounting portions of the condenser lens 209 within the condenser lens 209. Particularly when such randomly-reflected light leaks toward the original-mount glass 205 from the side closer to the optical path 301 than the LED chips 208, the light illuminates the illuminating position A from a direction closer to the vertical direction relative to the surface of the original-mount glass 205 than the direct light from the LED chips 208. That is, the light emitted in direction $T_1$ enters the condenser lens 209 from a surface other than the condensing surface 209a, and is directed in direction $T_2$. The light is then directed in direction P after repeated reflection along a path indicated by two-dot chain lines, and is specularly reflected by the lower surface of the original-mount glass 205 to enter the optical path 301, functioning as noise for an image reading signal and causing a failure in an image reading operation. Another light beam in direction Q is also present, and the light is specularly reflected by the upper surface of the original-mount glass 205, causing the same failure. Such a noise component is in some cases as large as 10–20% of the light reflected by the original.

Furthermore, since variations are present in the magnitude of the noise in accordance with the arrangement of the row of the LED chips 208, an undulation in accordance with the row of the LED chips, the same as the undulation shown in FIG. 5, appears in the output from a CCD sensor, serving as a photosensitive member. As a result, vertical stripes having the same pitch as that of the row of the LED chips 208 appear in a read image.

It is possible to eliminate the influence of such undulations by sufficiently separating the LED array from the reading position. In this case, however, the amount of light from the LED chips cannot be sufficiently utilized. Hence, it is necessary to increase the number of the LED chips, causing an increase in the production cost. Another problem is that it is necessary to provide a space for separating the substrate having the LED array thereon from the reading position and hence the size of the device is increased.

The above-described disadvantages are further increased for the light randomly reflected by the electrodes explained with reference to FIGS. 7 and 8, if the condenser lens shown in FIG. 16 is provided. That is, light having small incident angles from the LED chips is reflected by the incident surface of the condenser lens, is then reflected by the electrodes on the substrate, and specularly illuminates the original-mount glass after passing through an end portion of the condenser lens. Since this light is superposed with the directly-illuminating light from the LED chips, it becomes noise, further increasing the degree of failure in an image reading operation.

SUMMARY OF THE INVENTION

It is an object of the present invention to provide an original reading device which prevents a failure in a reading operation of an original due to random reflection of illuminating light emitted from light-emitting devices.

It is another object of the present invention to provide an original illuminating device which prevents light from being reflected by electrodes which pass current through light-emitting devices.

It is still another object of the present invention to provide an original illuminating device which reduces the amount of randomly-reflected light issued from a lens for condensing light emitted from light-emitting devices.

According to a first aspect of the present invention, an original illuminating device includes a substrate, and a plurality of light-emitting devices disposed on the substrate for emitting light to illuminate an original. A plurality of electrodes are disposed on the substrate for passing current through the light-emitting devices. The light-emitting devices and the electrodes are provided on the same surface of the substrate. Anti-reflection means are provided on the electrodes to prevent light from being reflected from the electrodes.

According to another aspect of the present invention, an original illuminating device includes a plurality of light-emitting devices for emitting light to illuminate an original. A plurality of electrodes (each provided for each of the plurality of light-emitting devices) are provided for passing current through the light-emitting devices. The plurality of electrodes are linearly arranged on the substrate. Anti-reflection means are provided on the plurality of electrodes for preventing light from being reflected from the electrodes.

According to a further aspect of the present invention, an original reading device includes a plurality of light-emitting devices for emitting light to illuminate an original. A plurality of electrodes are provided For passing current through the light-emitting devices. A photosensing member is provided for receiving light reflected by the original illuminated by the light-emitting devices to read an image on the original. Anti-reflection means are provided for preventing light reflected by the electrodes from reaching the photosensing member.

According to yet a further aspect of the present invention, an original illuminating device includes a light source, and a condenser lens for condensing light emitted from the light source to illuminate an original with light issued from a condensing surface of the condenser lens. Surfaces of the condenser lens different from the condensing surfaces are light diffusion surfaces.

According to yet another aspect of the present invention, an original illuminating device includes a light source, and a condenser lens for condensing light emitted from the light source. An original is illuminated by the light issued from the condensing surface of the condenser lens. An anti-transmission member prevents the transmission of light and is provided on an end portion of the condensing surface of the condenser lens.

According to still another aspect of the present invention, an illuminating device comprises a light source and a lens comprising a resin for transmitting light emitted from the light source. Surfaces of the lens which are different from the light emitting lens surfaces comprise diffusion surfaces.

According to another aspect of the present invention, an illuminating device comprises a substrate, and a plurality of light-emitting devices for emitting light, the devices being linearly arranged on the substrate. A rod-like lens is provided on the substrate for condensing light emitted from the plurality of light-emitting devices. An opening is provided for allowing the circulation of air in a direction orthogonal to the longitudinal direction of the lens.

According to a further aspect of the present invention, an original reading device comprises a light source, a condenser lens for condensing light emitted from the light source, and a photosensing member for illuminating an original with light issued from a condensing surface of the condenser lens and for receiving reflected image light. Prevention means are provided for preventing light issued from an end portion of the condensing surface of the condenser lens from reaching the photosensing member.

These and other objects of the present invention will become even more apparent from the following description of the preferred embodiments of the invention.

DETAILED DESCRIPTION OF THE PREFERRED EMBODIMENTS

Preferred embodiments of the present invention will now be explained with reference to the drawings.

Figure 1:
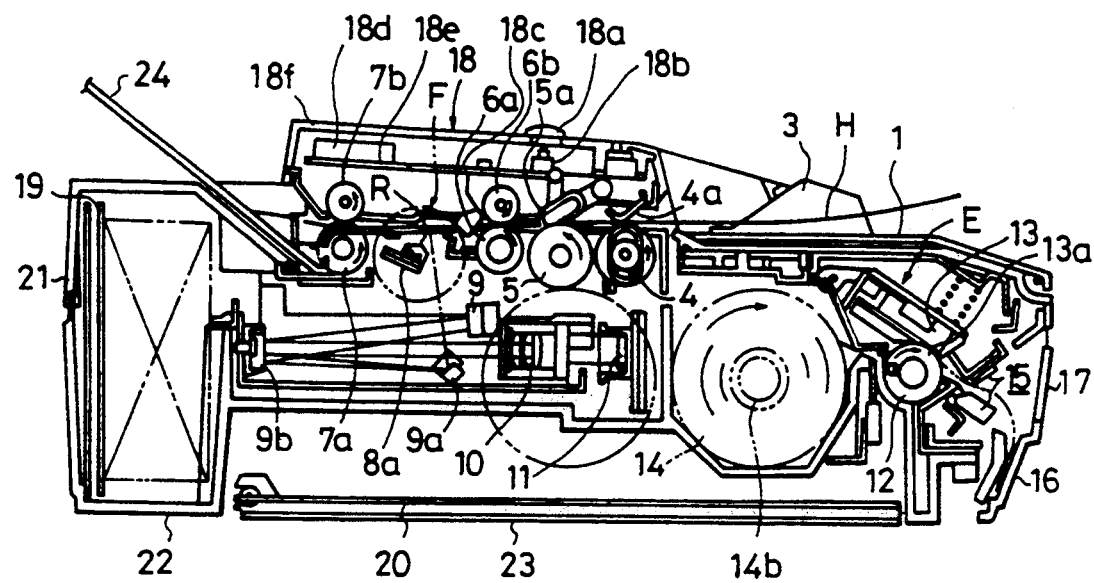
FIG. 1 is a cross-sectional view of an image reading device to which the present invention is applicable.

FIG. 1 is a lateral cross-sectional view of a facsimile apparatus to which the present invention is applicable. First, an explanation will be provided of the apparatus.

In FIG. 1, there is shown an original Feeding and reading system F. Both ends of plural sheets of originals H disposed on an original mount 1, also serving as a cover of the apparatus, with the surface of the original facing down are guided by a sheet guide member 3. Several sheets are fed by a preliminary feed roller 4 from below the originals H, and are separated one by one by a separation roller 5. There are also shown pressing pieces 4a and 5a. Each separated sheet of the original H is illuminated by LED chips (to be described later), serving as light-emitting devices, while being fed at a constant speed by a pair of feed rollers 6a and 6b and a pair of discharge rollers 7a and 7b. The light reflected by the original H reaches a photoelectric conversion device (photosensitive member) 11, such as a CCD or the like, via a mirror 9 and a lens 10, and is converted into an electric signal. The signal is transmitted to a predetermined recording system E.

When a recording signal from another apparatus, or in the form of an electric signal converted by the photoelectric conversion device 11 of the apparatus has been input to the recording system E, a platen roller 12 rotates in the direction of arrow "a", and a recording head 13 having a plurality of heating elements 13a which are heated in accordance with an image signal is driven and heated. Thus, a predetermined image is recorded on heat-sensitive recording paper 14 provided in the form of a roll. The heat-sensitive paper 14, after recording, is cut from the rear end of the recorded image by a cutter 15, and the cut sheet is received in a reversal tray 16.

There is shown an opening 17 for taking out the heat-sensitive paper 14 after recording.

There are also shown an operation panel 18, a key top 18a for a start key and the like, a tact switch 18b, a printed circuit board 18c for the electric circuitry for the panel 18, a display unit 18d, such as an LCD (liquid-crystal display) or the like, and a printed circuit board 18e for the driving circuitry for the display unit 18d. A transparent cover 18f is provided on the cover of the display unit 18d. It is possible to confirm the contents of display by viewing through the cover 18f. Furthermore, there are shown a power supply 19, a printed circuit board 20 for system control circuitry, an upper cover 21, and a base cover 22, also serving as a support structure. A plate cover 23 covers the back surface of the printed circuit board 20 in order to protect it. A paper discharge tray 24 mounts discharged originals.

A detailed explanation will now be provided of an embodiment of the present invention.

Figure 2:
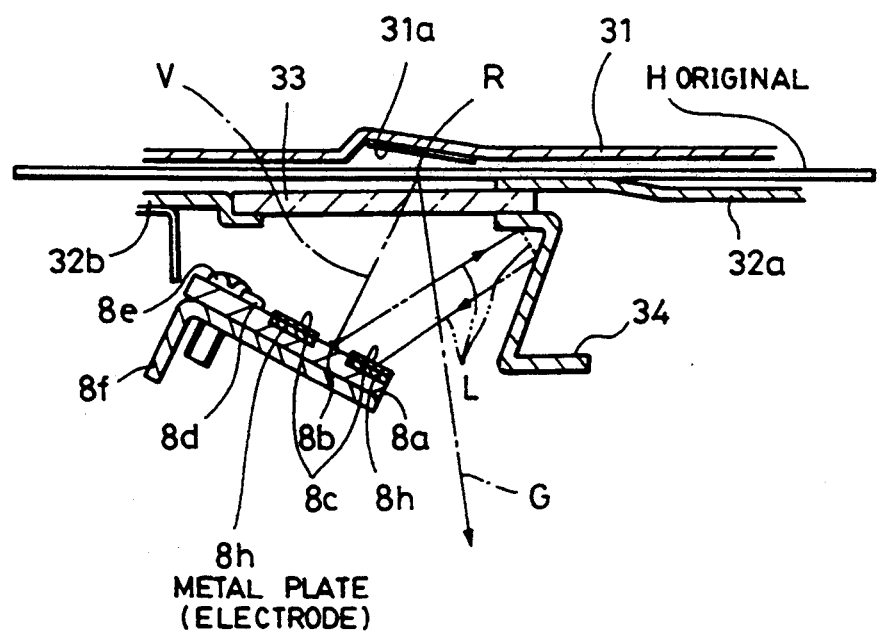
FIG. 2 illustrates an original illuminating device according to an embodiment of the present invention.

FIG. 2 illustrates an original illuminating device according to an embodiment of the present invention. The device is applicable to the reading system F of the apparatus shown in FIG. 1.

In FIG. 2, there are shown an upper original mount 31, a white reference background 31a secured to the upper original mount 31, lower original mounts 32a and 32b, original-mount glass 33, a reflecting plate 34, optical axis G, and reading position R. The white reference background 31a is previously read by a photoelectric conversion device 11 before feeding an original H. The white background 31a serves as a reference for a white original, and is used for shading correction when the light refleted by the original H is read by the photoelectric conversion device 11.

Thus, even if light, after repeating illumination and reflection several times, enters the photoelectric conversion device 11 in the absence of the original H to increase the amount of light, it is possible to perform proper processing wherein white is processed as white since the level of the reference for white has been increased.

A substrate 8a for an LED array is made of a material, such as aluminum, glass, epoxy resin or the like. LED chips, 8b, serving as light-emitting devices, are bonded on the substrate 8a on a straight line along the longitudinal direction.

Figure 8:
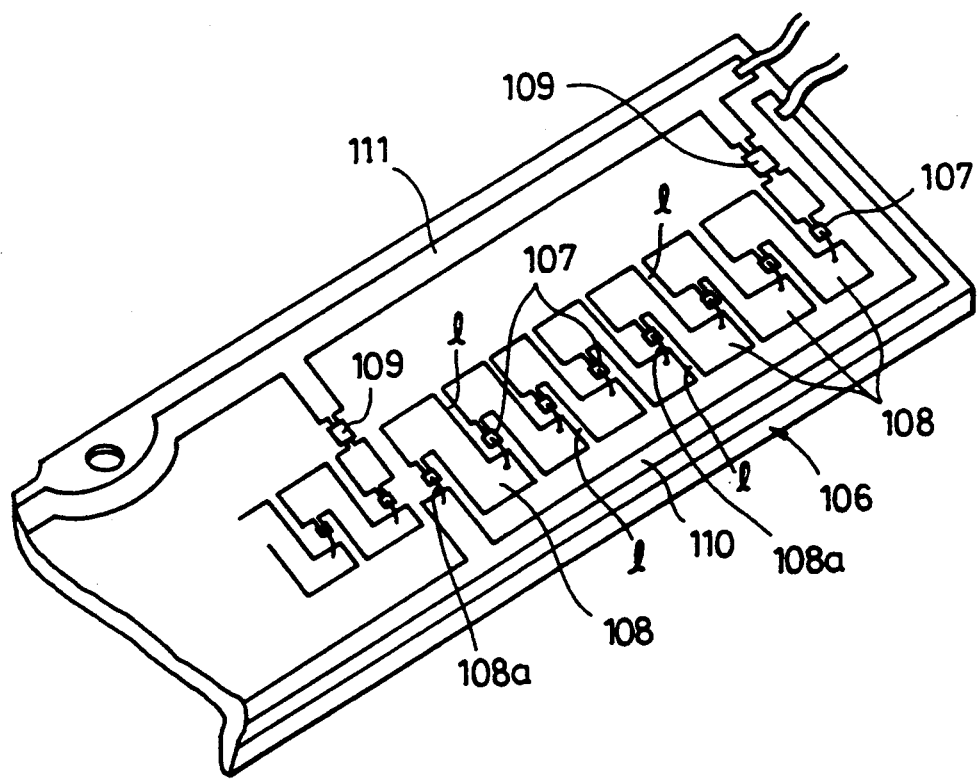
FIG. 8 is a perspective view of the illuminating device shown in FIG. 7.

Electrodes 8h for passing current are provided for respective LED chips, and have the same configuration as the electrodes of the illuminating device shown in FIG. 8.

Anti-reflection films (anti-reflection means) 8c are provided on the substrate 8a so as to mask metal plates 8h. For example, a resist, serving as an insulating member to provide spaces for soldering, may be satisfactorily used for the anti-reflection films 8c.

Figure 3:
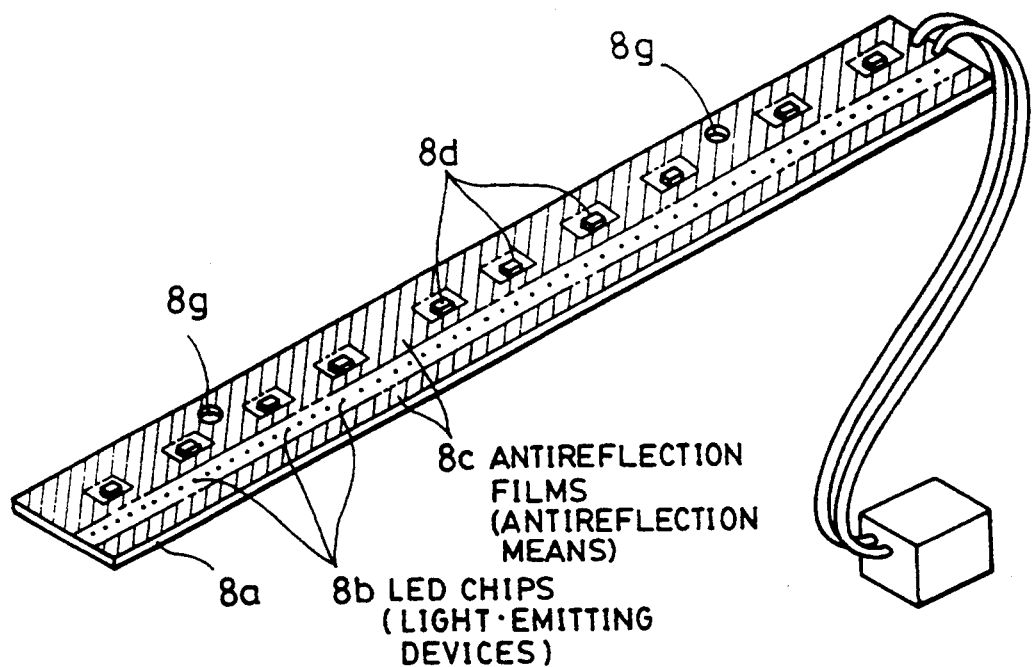
FIG. 3 is a perspective view of the illuminating device shown in FIG. 2.

FIG. 3 is a perspective view of the above-described substrate 8a.

In FIG. 3, surface-mounting-type chip resistors are used as current-limiting resistors 8d. A lock screw 8e (see FIG. 2) secures the substrate 8a to a holding member 8f. There is also shown an insertion hole 8g for the lock screw 8e.

In the above-described configuration, the illuminating light from the LED chips 8b reaches the reading position R of the original H through optical path V, as shown in FIG. 2. The light reflected by the original H is guided to the photoelectric conversion device 11 through optical path G to be read as an image.

Even if the illuminating light from the LED chips 8b returns, for example, from the reflecting plate 34 toward the side of the substrate 8a through optical path L due to random reflection from surrounding portions (actually, there is the possibility of returning from all directions), the returned light is incident upon the anti-reflection film 8c covering the metal plate 8h, and hence no further reflection occurs.

Figure 5:
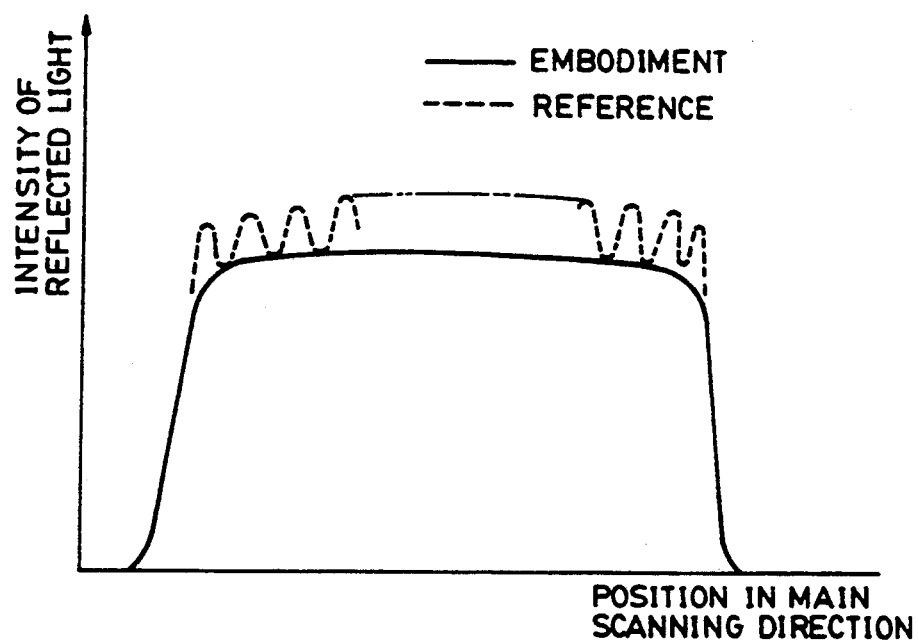
FIG. 5 is a diagram showing the intensity of reflected light of a photosensitive member in the FIG. 2 embodiment.
Figure 6:
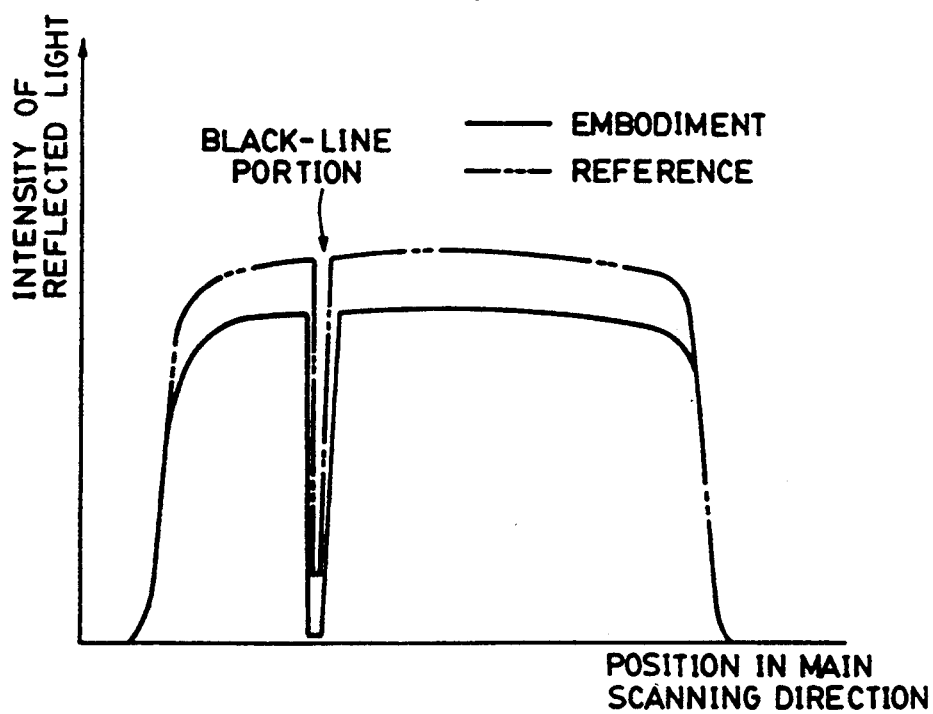
FIG. 6 is a diagram showing the intensity of reflected light in the photosensitive member when a black line is present.
Figure 7:
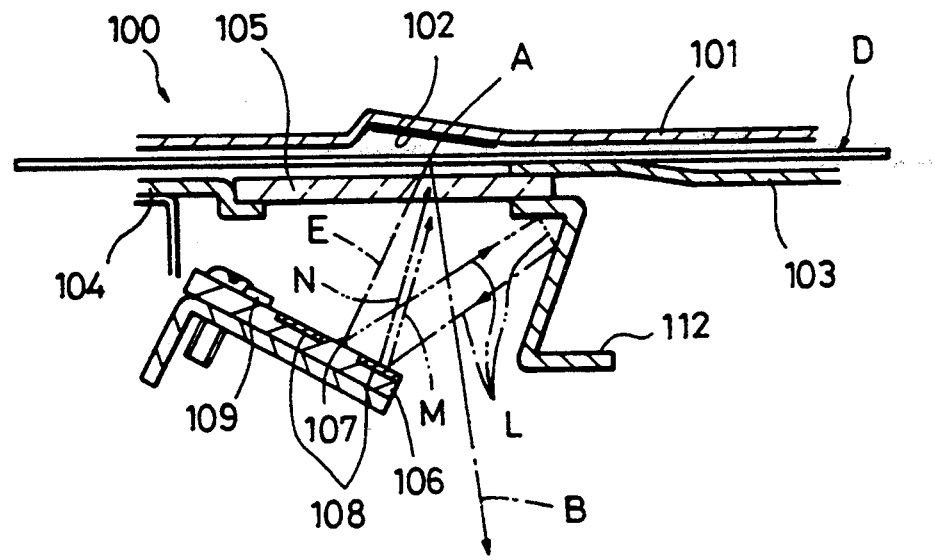
FIG. 7 illustrates an original illuminating device, to describe a background technique of the present invention.

Accordingly, the photoelectric conversion device 11 can always correctly perform an image reading operation of the original H without being influenced by random reflection. The intensity of the reflected light for one line when the original H (totally white) is read by the photoelectric conversion device 11 is stable, as indicated by a solid line in FIG. 5. It can be understood that the result is entirely different from the result wherein an anti-reflection film is not provided. It can be also understood that, as indicated by a solid line in FIG. 6, as for the intensity of reflected light for one line from the totally white original H in part of which a vertical black line is present, the intensity for the black-line portion is completely decreased. In a reference reading indicated by a two-dot chain line, the intensity of the same portion is not completely decreased.

Since the anti-reflection films 8c can be formed on the substrate 8a at the same time as when the LED chips 8b are bonded, the production cost is not increased. Furthermore, since the anti-reflection films 8c directly cover the metal plates 8h, a complicated light-obturating mechanism is unnecessary. Hence, it is possible to dispose the LED chips 8b close to the original H, that is, the reading position R. As a result, the present embodiment also has the effect that the entire device can be made compact.

While, in the foregoing embodiment, the anti-reflection films 8c are provided on both sides of the LED chips 8b, only the metal plate 8h at the side of the optical path G wherein random reflection is apt to occur may be coated.

Although, in the foregoing embodiment, an explanation has been provided of only the formation of the anti-reflection film 8c using a resist, the following processing may also be performed (not specifically illustrated). That is, a black sheet made of resin, such as PET (polyethylene terephthalate) or the like, subjected to matting processing may be adhered to the metal plate 8h as an anti-reflection means. Alternatively, black and mat printing may be directly provided on the surface of the metal plate 8h, or a black felt having fine fibers on its surface may be adhered to the metal plate 8h as an anti-reflection means.

Although, in the foregoing embodiment, the anti-reflection film is provided even on portions other than the electrodes so as to cover the plural electrodes with a single film, the anti-reflection film may be individually provided on each electrode having a high reflectivity.

Figure 4:
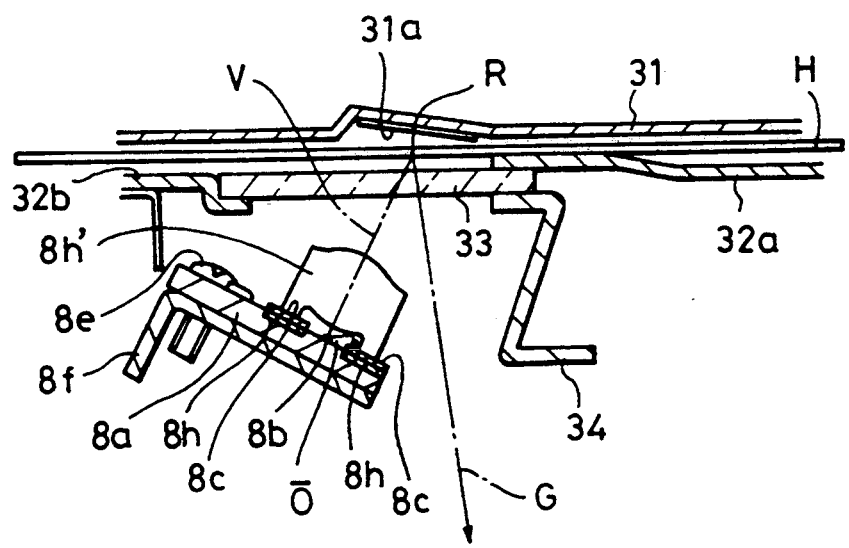
FIG. 4 illustrates a lens mounted on the illuminating device shown in FIG. 2.

While, in the FIG. 2 embodiment, in order to simplify the explanation, a structure which does not have a condenser lens on the LED chips 8b has been explained, the same effect may be obtained even if a lens is provided on the LED chips 8b. FIG. 4 shows a cross-sectional view of a structure which has a lens on the LED chips 8b. In FIG. 4, a rod-like lens 8h', made of acrylic resin or the like, comprises a lens portion and a lens mounting portion formed as one body. Other components are the same as those described above with reference to FIG. 2. Light $\overline{O}$ emitted from the LED chips 8b and returning by being reflected by the lower surface of the lens 8h' does not reach the reading position R because the anti-reflection film 8c is present. Accordingly, the same effect as in the foregoing embodiment can be obtained.

Although, in the foregoing embodiment, the LED chips 8b are directly bonded on the substrate 8a, the LED chips 8b may be provided in the form of a module using resin.

Another embodiment of the present invention will now be described.

Figure 9:
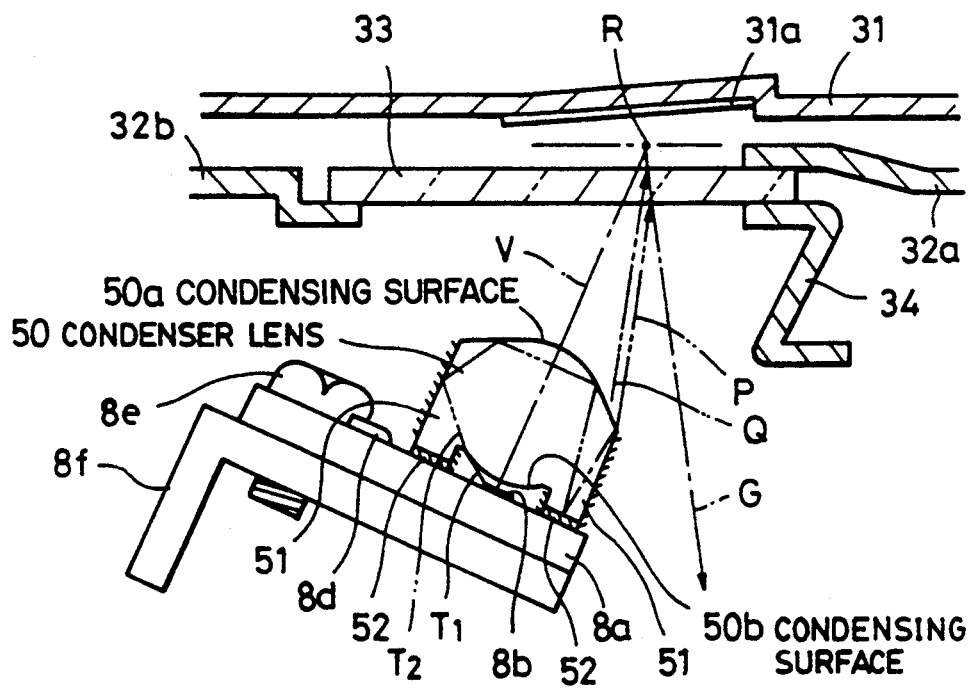
FIG. 9 illustrates an original illuminating device according to another embodiment of the present invention.

FIG. 9 illustrates an original illuminating device according to another embodiment of the present invention.

In FIG. 9, there are shown an upper original mount 31, a white reference background 31a secured to the upper original mount 31, lower original mounts 32a and 32b, original-mount glass 33, a reflecting plate 34, optical path G, and reading position R.

Figure 10:
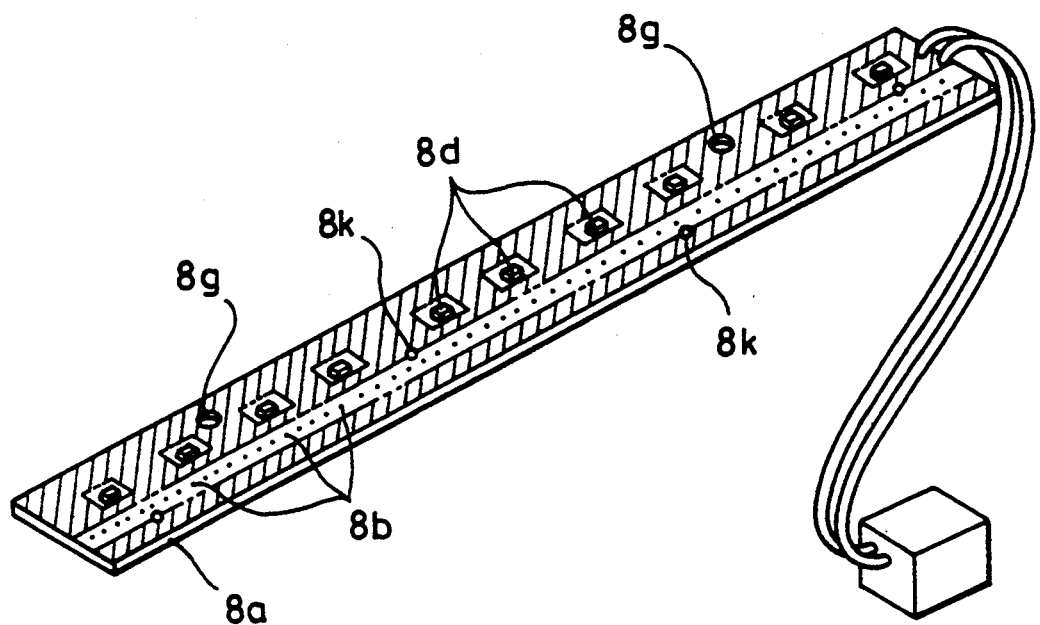
FIGS. 10 is a perspective view of a substrate of the illuminating device shown in FIG. 9.

A substrate 8a disposed facing the reading position R is made of aluminum, glass, epoxy resin, or the like. As shown in FIG. 10, LED chips 8b, serving as light-emitting devices, are bonded on the substrate 8a in a straight line along the longitudinal direction thereof (the direction of the width of original H). A condenser lens 50, made of acrylic resin, comprises condensing surfaces 50a and 50b which are constituted by upper and lower curved surfaces, respectively, and base portions 51 supporting them, formed as one body. The condensing surfaces are lens surfaces. Light entering and leaving the condensing surfaces is subjected to a lens function, and is condensed onto the reading position R. As shown in FIGS. 9 and 10, bosses 52 projecting from the base portions 51 are calked by heat to calking holes 8k provided in the substrate 8a to fix the condenser lens 50. That is, the condenser lens 50 contacts the substrate 8a only at a few boss portions. The other portion of the condenser lens 50 is separated from the substrate 8a. Thus, an opening to allow the circulation of air is formed in a direction orthogonal to the longitudinal direction of the condenser lens 50. Accordingly, the heat generated from the LED chips is not confined in a space between the condenser lens 50 and the substrate 8a. It is therefore possible to suppress a change in characteristics of the condenser lens 50 due to the heat. Hatched portions on the outer circumference of the condenser lens 50, that is, the entire surfaces other than the condensing surfaces 50a and 50b, are subjected to embossing processing for diffusing light to provide diffusing surfaces like frosted glass. The embossing processing is performed in a mold at the same time when the condenser lens 50 is formed by injection. Surface-mounting-type chip resistors are used as current-limiting resistors 8d. A holding member 8f also serves as a heat-radiating plate. A lock screw 8e fixes the substrate 8a to the holding member 8f. There is also shown optical path V perpendicular to the substrate 8a.

Figure 11:
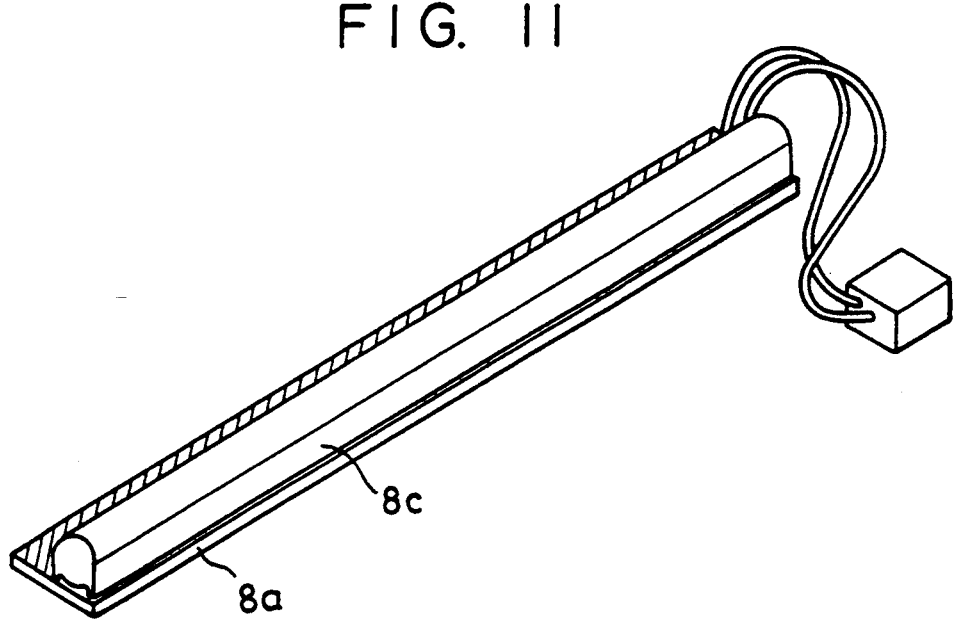
FIG. 11 is a perspective view of the illuminating device shown in FIG. 9.

FIG. 10 is a perspective view of the substrate 8a of the present embodiment. FIG. 11 is a perspective view of the substrate 8a when the condenser lens 50 is mounted. In FIG. 10, there are shown the calking holes 8k for the condenser lens 50 which are arranged in a zigzag form, and holes 8g for screwing the substrate 8a on the holding member 8f.

In the above-described configuration, as shown in FIG. 9, the light from the LED chips 8b reaches the reading position R of the original H through the optical path V. The light reflected by the original H is guided to the photoelectric conversion device 11 through the optical path G, and is read as an image.

Figure 12:
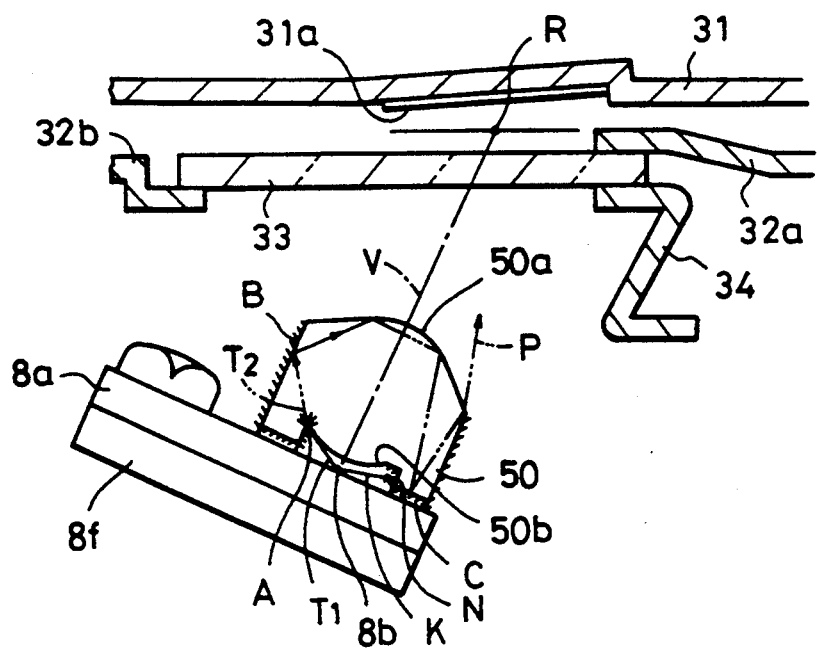
FIG. 12 is a diagram illustrating the function of randomly-reflected light in the FIG. 9 device.

The light emitted from the LED chips 8b and directed to surfaces of the condenser lens 50 other than the condensing surfaces 50a and 50b is diffused. Hence, it is possible to prevent random reflection within the condenser lens 50 and adverse influence (noise) on an image reading operation. That is, as shown in FIG. 12 representing an enlarged view of the structure of the condenser lens 50, light $T_1$ emitted toward surface A (processed to be a diffused surface) is diffused in the directions of a plurality of arrows indicated at the surface A, and hence the intensity of the light directed toward direction $T_2$ is greatly decreased. Since diffusion is further repeated at surface B and surface C, the intensity of the light finally leaving in direction P is extremely decreased. The same holds true also for light K directed toward diffusing surface N.

The surface A is a surface between the condensing surface 50b and the base portion 51. The surface B is a lateral surface of the condenser lens 50. The surface C is an outer surface of the base portion 51 which is different from the portion of the mounting boss 52, and which faces the substrate 8a separated from it. The surface K is a lateral surface of the base portion 51 facing a lateral surface of the condenser lens 50.

An explanation has been provided of examples of light beams acting as noise components. However, since there is the possibility that other optical paths of light beams acting as identical noise components are present due to variations in bonded positions of the LED chips 8b, mounted position of the substrate 8a, and the like during the production of the device, it is in general a safe approach to perform diffusion processing on all surfaces other than the condensing surfaces 50a and 50b, as in the present embodiment.

Figure 13:
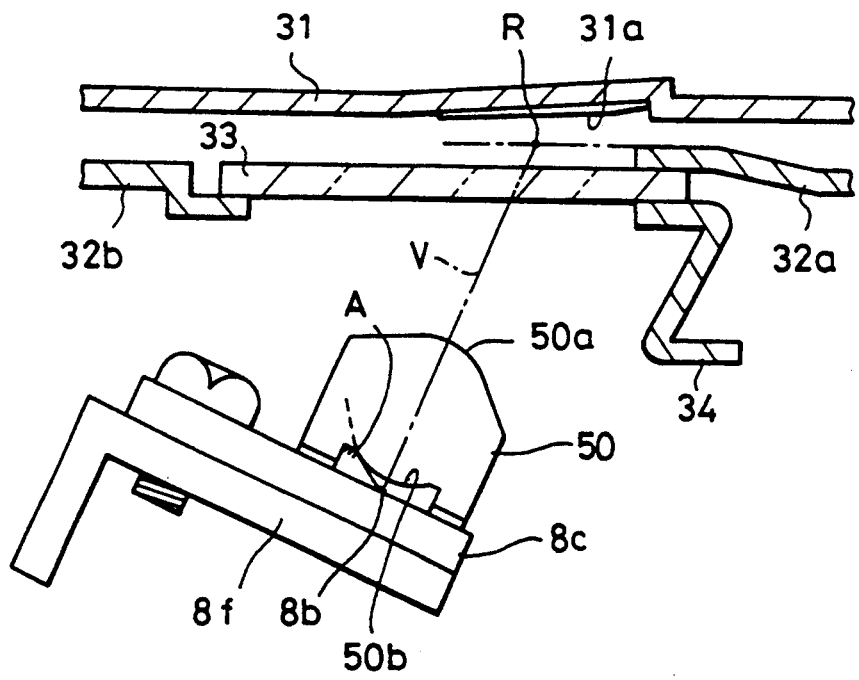
FIG. 13 illustrates still another embodiment of the present invention.
Figure 14:
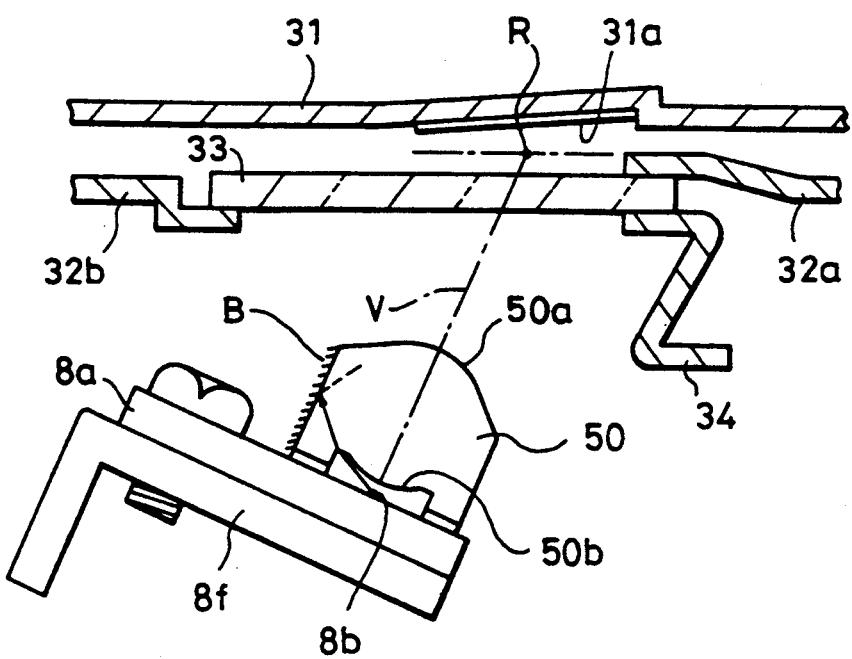
FIG. 14 illustrates still a further embodiment of the present invention.

Although, in the foregoing embodiment, diffusion processing is performed on all surfaces of the condenser lens 50 other than the condensing surfaces 50a and 50b, it is possible to decrease the portion subjected to diffusion processing, if variations in the substrate 8a itself, its mounted position on the image reading device, and the like during the production of the device are small, and optical paths of light beams acting as noise components are identified and relatively stable. FIGS. 13 and 14 show embodiments representing such cases. In the FIGS. 13 and 14 embodiments, diffusion processing is performed only on surface A and surface B, respectively, to cut optical paths through the respective surfaces. By thus limiting the portions to be subjected to diffusion processing to the minimum necessary portions, a peculiar effect may also be obtained. That is, in the earlier embodiment, in order to facilitate diffusion processing, diffusion processing is performed on all surfaces other than the condensing surfaces of the condenser lens 50, including the surface N shown in FIG. 12. When the direct light K from the LED chips 8b is incident upon the surface N, the surface N, which is a diffusing surface, issues the diffused light as a secondary light source. There is the possibility that the diffused light is reflected by the surface C, and the reflected light leaves in the direction P as a noise component, though its intensity is very small. In the embodiments shown in FIGS. 13 and 14, however, such a problem never arises, since the surfaces C and N are not diffusing surfaces.

In the foregoing embodiment, embossing processing is performed in the mold as diffusion processing. For an already-formed condenser lens, however, a method to etch its surface with chemicals, such as sulfuric acid or the like, is also effective. According to this method, diffusion processing may be performed even on portions which cannot be subjected to embossing processing due to the structure of the mold.

As another method of diffusion processing, sandpapering is also effective. According to this method, it is possible to very simply perform diffusion processing for an already-formed condenser lens without providing particular equipment.

In the present invention, since diffusion processing is directly performed on surfaces of the condenser lens 50 other than the condensing surfaces 50a and 50b, it is possible to dispose the substrate close to the illuminating position, and hence to make the entire device compact. Furthermore, an insufficient amount of light caused by separating the substrate from the illuminating position, and an increase in the production cost accompanying an increase of the number of LED chips do not occur.

Figure 15:
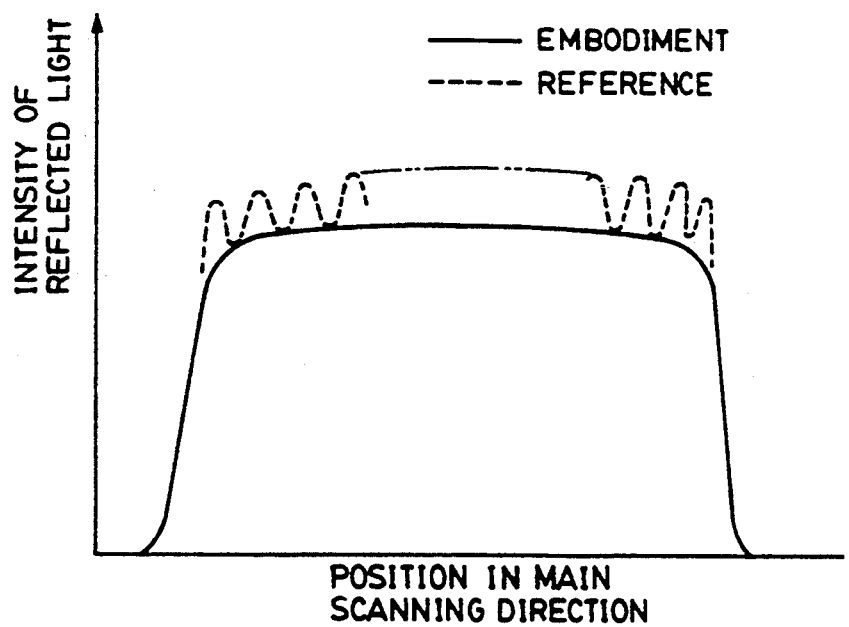
FIG. 15 is a diagram showing the intensity of reflected light in a photosensitive member of the FIG. 9 embodiment.
Figure 16:
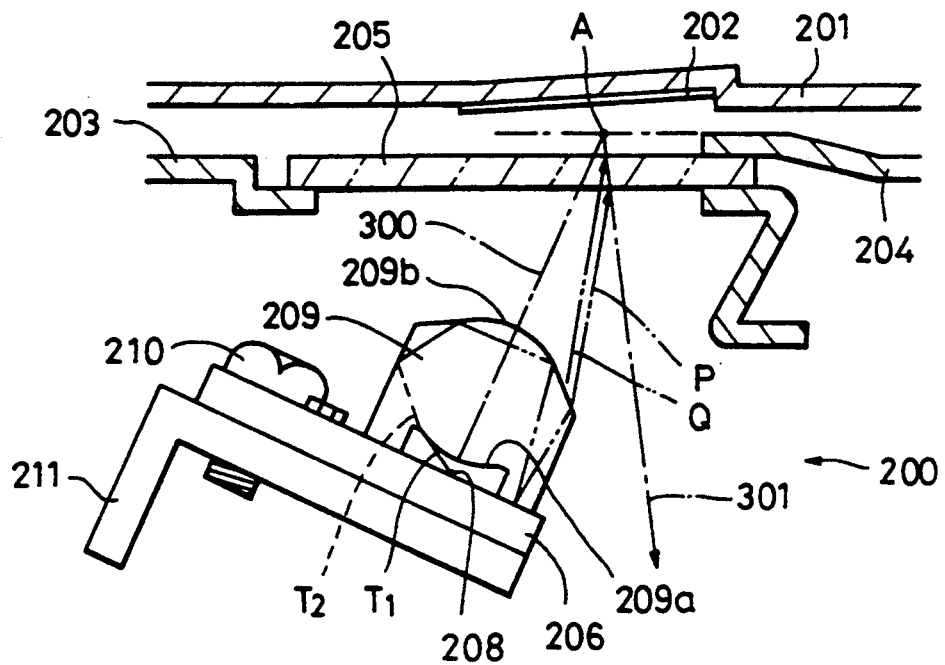
FIG. 16 illustrates an original illuminating device, to describe a background technique of the present invention.

FIG. 15 is a diagram showing outputs from the photoelectric conversion device (CCD) when a totally white original is read. The abscissa represents time, that is, the position in the main scanning direction, and the ordinate represents output voltage, that is, the intensity of light. A solid line represents an output in the embodiment of the present invention. It can be understood that undulations present in a reference reading wherein diffusion processing is not performed disappears, and a flat waveform is obtained.

Still another embodiment of the present invention will now be described.

Figure 17:
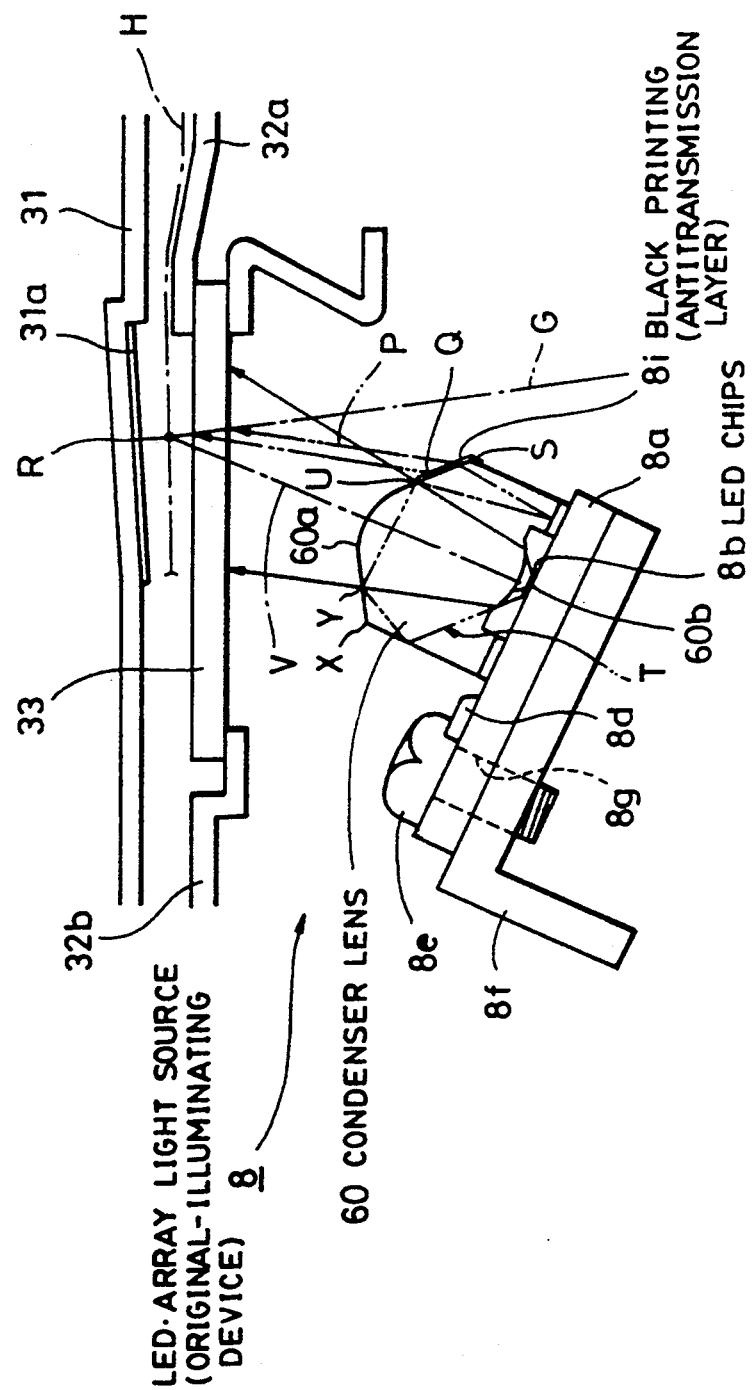
FIG. 17 illustrates an original illuminating device according to still another embodiment of the present invention.

FIG. 17 illustrates an original illuminating device according to still another embodiment of the present invention. The basic configuration of the device is substantially the same as the configuration of the previous embodiment, and an explanation will be provided of only portions different from those of the previous embodiment.

Only part of a condensing surface 60a of a condenser lens 60 within the range YU is actually effective for condensing light. However, if the lens is present only within the range YU, edges of the range YU cannot provide proper lens characteristics. In order to provide proper lens characteristics in the entire region of the range YU, lens portions within the ranges XY and US extended from the range must be present.

In the present embodiment, black printing 8i, serving as an anti-transmission layer, to prevent the transmission of light is provided on part of the outer surface of the condenser lens 60, that is, the portion US shown in FIG. 17.

Although, in FIG. 17, the thickness of the printing 8i is exaggeratedly depicted, the actual thickness is about 100 μm. The printing 8i is performed by printing within a mold.

Figure 18:
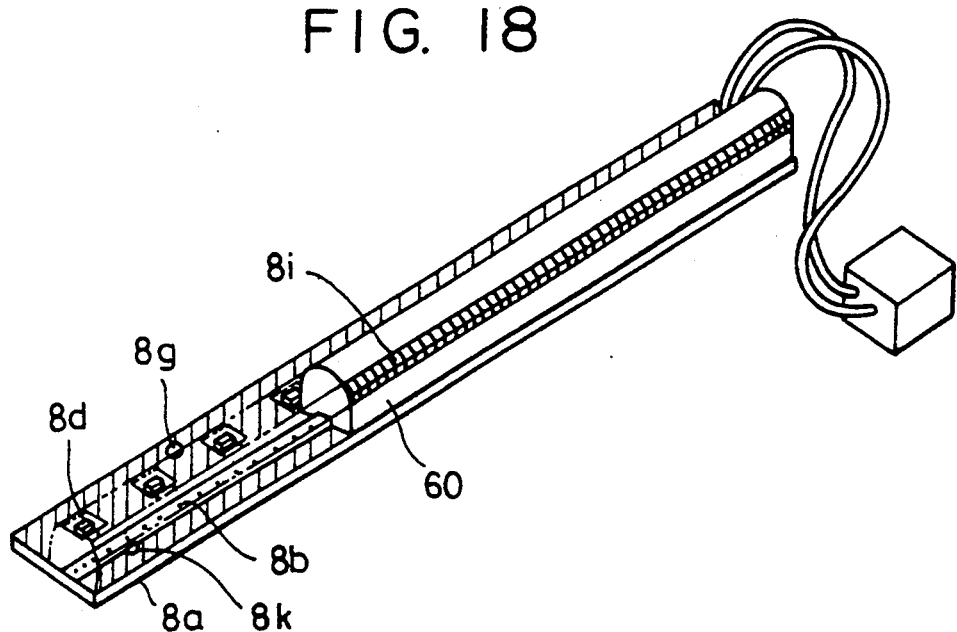
FIG. 18 is a perspective view of the illuminating device shown in FIG. 17.

FIG. 18 is a perspective view of an LED array light source 8 according to the present embodiment. In FIG. 18, there are shown a calking hole 8k for the condenser lens 60, and a hole 8g for screwing a substrate 8a on a holding member 8f (not shown).

In the above-described configuration, the original H is illuminated by the LED array light source 8. The light reflected by the original H is incident upon the photoelectric conversion device 11 via the mirror 9 and the lens 10 shown in FIG. 1 to be read as an image.

The function of the present embodiment will now be explained in detail.

In FIG. 17, the light From the LED chips 8b illuminates the reading position R in the vertical direction V, and the light reflected and diffused from the surface of the original H in optical path G is read. Other optical paths for the LED emission causes the following problems. The light directed in direction T enters the condenser lens 60 from surfaces other than the condensing surfaces, and finally leaves in direction P after repeated reflection along a path indicated by two-dot chain lines. The light in the direction P is specularly reflected by the lower surface of original-mount glass 33 in the direction of optical path G, functioning as noise for an image reading signal and causing a failure in an image. Another optical path in direction Q is also present. The light along this optical path is specularly reflected by the upper surface of the original-mount glass 33, causing the same kind of failure.

According to the present embodiment, however, since the black printing 8i is provided on the portion of the condenser lens 60 where randomly-reflected light leaves in the direction P, the randomly-reflected light does not leave in this direction, and a failure in an image reading operation caused by random reflection does not occur.

The effect of the black printing 8i will be simply explained with reference to FIG. 19.

Figure 19:
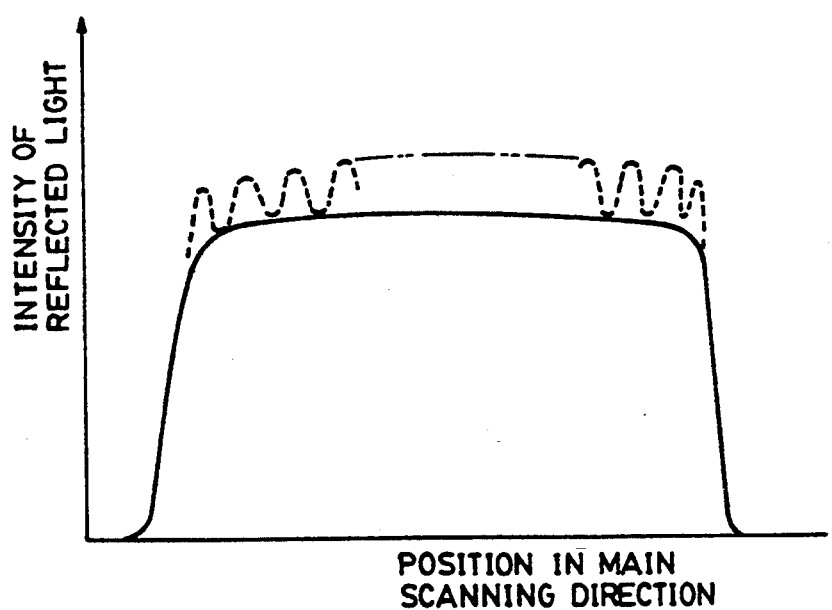
FIG. 19 is a diagram showing the intensity of reflected light in a photosensitive member of the FIG. 17 embodiment.

FIG. 19 is a diagram showing outputs from the photoelectric conversion device (CCD) when a totally white original is read. The abscissa represents time, that is, the position in the main scanning direction, and the ordinate represents output voltage, that is, the intensity of light. An output when the anti-transmission layer is not formed on the condenser lens 60 is indicated by the broken line. Undulations in the intensity are present in accordance with the arrangement of the LED chips 8b. An output using the LED array light source 8 according to the present embodiment is indicated by the solid line. It can be understood that the undulations disappear and a flat waveform is obtained.

Although, in the foregoing embodiment, the black printing is performed by printing within a mold, the same effect may be obtained by performing, for example, totally black silk printing on a lens after being formed.

Alternatively, the anti-transmission layer may be formed by performing coating on a condenser lens after being formed using masking. This method is effective when printing in a mold cannot be performed due to the structure of the mold, or when it is desired to provide the anti-transmission layer of the present embodiment on a condenser lens after being formed.

Furthermore, a tape-like member which does not transmit light may be used as an alternative to printing or coating. This approach can be very simply performed without any particular preparation for a condenser lens after being formed.

The color for printing, coating or the like is not limited to black, but any color effective for the emission of the LED chips may be selected in consideration of spectral characteristics of the emission. For example, in the case of LED chips emitting yellow light, it is possible to consider a method to provide blue and transparent printing, and the like.

The individual components shown in outline or designated by blocks in the Drawings are all well-known in the image processing arts and their specific construction and operation are not critical to the operation or best mode for carrying out the invention.

While an explanation has been provided of the preferred embodiments of the present invention, the present invention is not limited to the above-described embodiments, but various changes and modifications may be made within the true spirit and scope of the invention.

What is claimed is:

1. An original illuminating device comprising:
   a light source; and
   a condenser lens for condensing light emitted from said light source to illuminate an original with light issued from a condensing surface of said condenser lens, wherein at least part of a surrounding surface of the condensing surface of said condenser lens is a light diffusion surface for moderating the issue of randomly-reflected light from said condenser lens toward an original.

2. A device according to claim 1, wherein said light diffusion surfaces are lateral surfaces of said condenser lens.

3. A device according to claim 1, further comprising a substrate for mounting said condenser lens, and wherein said light diffusion surfaces include surfaces of said condenser lens for mounting said condenser lens on said substrate.

4. A device according to claim 1, wherein said condenser lens comprises a resin.

5. A device according to claim 1, wherein said light diffusion surfaces comprise mold-embossed surfaces.

6. A device according to claim 1, wherein said light source comprises an LED array, and wherein said condenser lens comprises a rod-like lens.

7. An original illuminating device comprising:
   a light source;
   a condenser lens for condensing light emitted from said light source, an original being illuminated by light issued from a condensing surface of said condenser lens; and
   an anti-transmission member, provided on an end portion of the condensing surface of said condenser lens, for preventing the transmission of light.

8. A device according to claim 7, wherein the condensing surface of said condenser lens is curved, and the end portion of the condensing surface comprises a portion in a direction of the curvature.

9. A device according to claim 7, wherein said anti-transmission member comprises a black material.

10. A device according to claim 7, wherein said anti-transmission member comprises a printed member.

11. A device according to claim 7, wherein said anti-transmission member comprises a coating.

12. A device according to claim 7, wherein said light source comprises an LED array, and wherein said condenser lens comprises a rod-like lens.

13. An illuminating device comprising:
    a light source; and
    a lens, comprising a resin, for transmitting light emitted from said light source, wherein at least part of a surrounding surface of a lens surface of said lens is a light diffusion surface for moderating the issue of randomly-reflected light from said lens.

14. A device according to claim 13, wherein said light source comprises an LED array.

15. A device according to claim 13, wherein said lens includes a condensing lens comprising acrylic resin.

16. An illuminating device comprising:
    a substrate;
    a plurality of light-emitting devices, linearly arranged on said substrate, for emitting light;
    a rod-like lens, provided on said substrate, for condensing light emitted from said plurality of light-emitting devices; and
    an opening for allowing circulation of air in a direction orthogonal to a longitudinal direction of said rod-like lens.

17. A device according to claim 16, wherein said rod-like lens includes a plurality of mounting members mounted on said substrate, and wherein said opening is formed by (i) a surface of said rod-like lens facing said substrate, (ii) said substrate, and (iii) said plurality of mounting members.

18. A device according to claim 17, wherein said plurality of mounting members are arranged in a zigzag form.

* * * * *

UNITED STATES PATENT AND TRADEMARK OFFICE
CERTIFICATE OF CORRECTION

PATENT NO. : 5,430,484

DATED : July 4, 1995

INVENTOR : HIROMICHI NAGANE, ET AL.

Page 1 of 2

It is certified that errors appear in the above-identified patent and that said Letters Patent is hereby corrected as shown below:

On the title page, item

[54] Title

"ILLUMIATING" should read --ILLUMINATING--.

[75] Inventors

"Ko J. Takahashi" should read --Koji Takahashi--.

[30] Foreign Application Priority Data

Insert --[30] Foreign Application Priority Data
March 8, 1990 [JP] Japan ..... 2-57393
April 6, 1990 [JP] Japan ..... 2-91790
April 6, 1990 [JP] Japan ..... 2-91791--

COLUMN 1

Line 2, "ILLUMIATING" should read --ILLUMINATING--;

Line 47, "glass 108" should read --glass 105--; and

Line 59, "A1" should read --Al--.

COLUMN 3

Line 28, "original,is" should read --original is--; and

Line 33, "chips 108." should read --chips 208.--.

COLUMN 5

Line 61, "of" should read --in-- and "in" should read --of--.

UNITED STATES PATENT AND TRADEMARK OFFICE
CERTIFICATE OF CORRECTION

PATENT NO. : 5,430,484

DATED : July 4, 1995

INVENTOR : HIROMICHI NAGANE, ET AL.

It is certified that errors appear in the above-identified patent and that said Letters Patent is hereby corrected as shown below:

COLUMN 11

Line 39, "range YU" should read --range $\widehat{YU}$--;

Line 41, range YU," should read --range $\widehat{YU}$,--; and range "YU" should read --range $\widehat{YU}$--;

Line 44, "range YU," should read --range $\widehat{YU}$,--; and "ranges XY and US" should read --ranges $\widehat{XY}$ and $\widehat{US}$--;

Line 45, "range" should read --range $\widehat{YU}$--; and

Line 49, "portion US" should read --portion $\widehat{US}$--.

Signed and Sealed this

Fourteenth Day of November, 1995

Attest:

BRUCE LEHMAN

*Attesting Officer*     *Commissioner of Patents and Trademarks*